United States Patent Office 3,260,703
Patented July 12, 1966

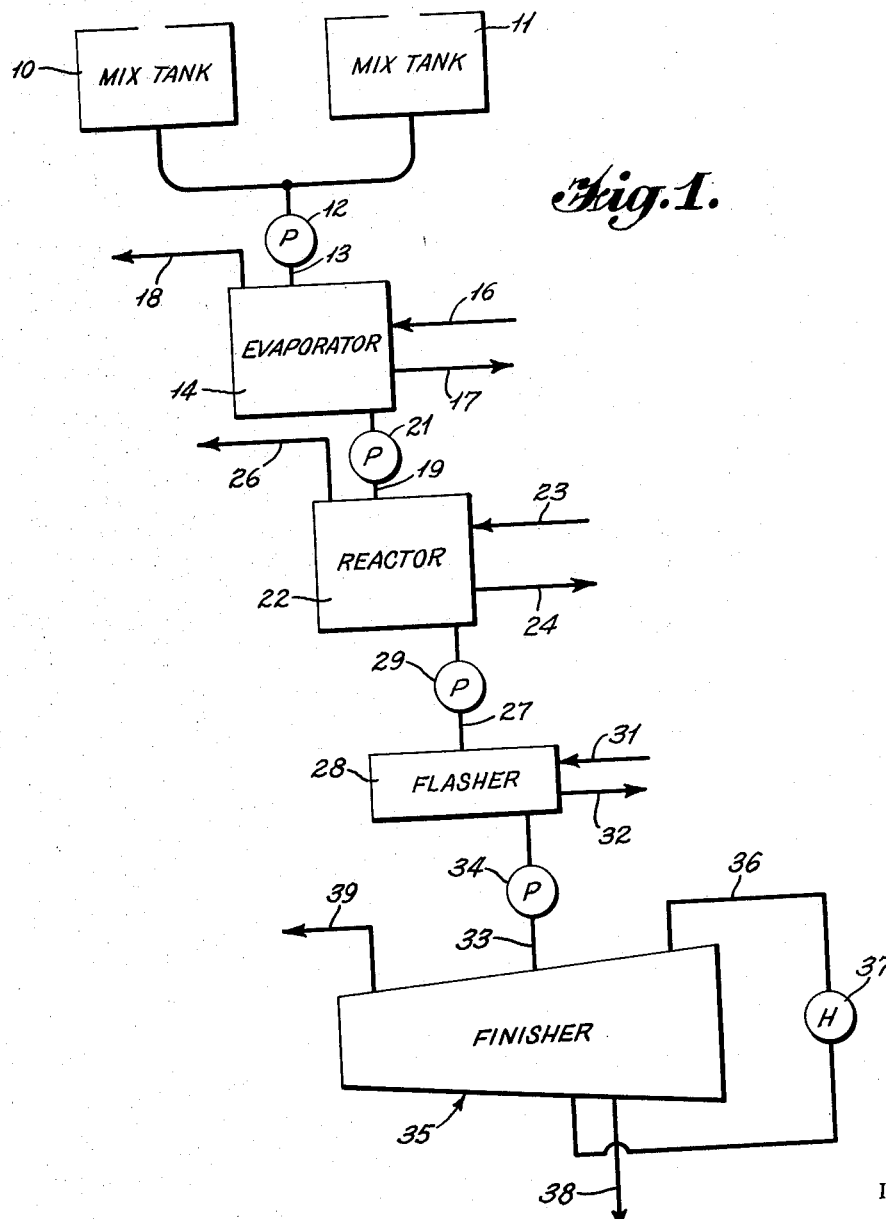

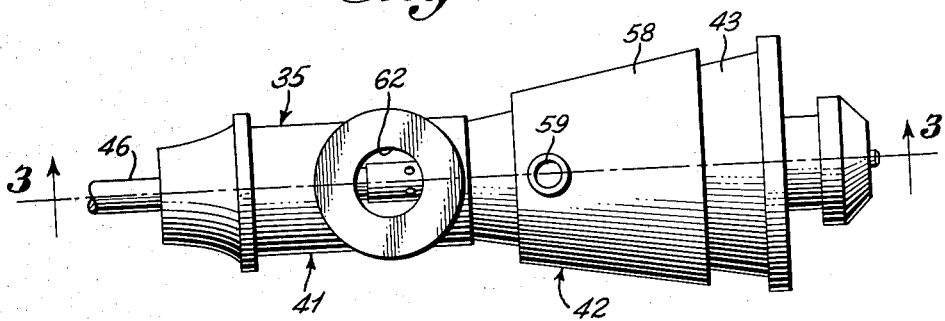
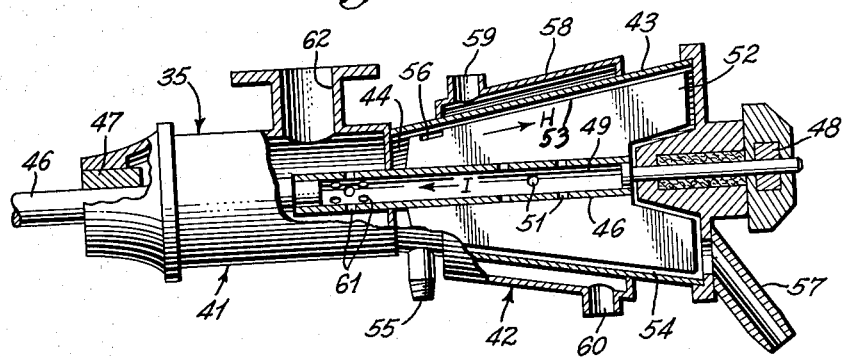

3,260,703
CONDENSATION POLYMER FINISHING PROCESS
Alva C. Coggeshall, Pensacola, Fla., assignor to Monsanto Company, a corporation of Delaware
Filed Sept. 8, 1964, Ser. No. 394,702
6 Claims. (Cl. 260—78)

This application is a continuation-in-part of co-pending application Serial Number 40,450, filed July 1, 1960, now abandoned.

This invention relates to a process for the preparation of high molecular weight polymers, especially those prepared by polycondensation reactions. More particularly, this invention relates to a process for the continuous preparation of polycondensation polymers, such as linear polyamides, polymeric polymethylene terephthalates, and the like, characterized by a high molecular weight, including those particularly useful in the formation of shaped articles, among which are films, filaments, fibers, and the like.

In one example of the formation of polycarbonamides, such as the nylons and the like, a solution of a polyamide-forming composition, usually containing water or other solvent, is subjected to superatmospheric pressures and polyamide-forming temperatures to carry out the polycondensation reaction. As the polycondensation of polyamide-forming compositions progresses, the viscosity of the polyamide reaction mass increases in a well-known manner. It has been found that with the use of heretofore known polymerization apparatus, portions of the viscous reaction mass tend to remain in a relatively stagnant or physically inert condition, particularly in the latter stages of the polycondensation process wherein the mass is ordinarily subjected to a rather poor reaction climate. This polycondensation climate, together with the increasing viscosity of the mass, tends to inhibit the efficient performance of the polycondensation process because the poly-joining of amine ends with carboxyl ends is greatly impeded and because considerable difficulty is experienced in removing water of reaction from the reaction mass. As a result of the inclination of the water of reaction to remain engaged in the mass, there is a tendency for the polycondensation process to reverse or not to proceed to the desired degree, thereby producing a polyamide end product of inferior quality.

Many difficulties have been encountered in the use of present day polycondensation apparatus, not only as a result of the poor reaction climate inherently induced by the use of known apparatus and to which the reaction mass is subjected, but also as a result of inferior heat transfer conditions common to such apparatus. Because of these drawbacks, it has been found that the reaction mass must be maintained at a high temperature for long periods of time in order to insure evaporation of volatile products and favorable completion of the polycondensation reaction. Maintaining polymer-forming compositions at a high temperature for a relatively long period of time produces thermal degradation or degeneration of the resultant polymer. As the polymerization process nears the desired degree of completion and the viscosity of the reaction mass approaches its desired optimum value, heat applied to the mass may cause local depolymerization and/or undesirable side reactions that produce obnoxious material commonly referred to as "gel." Although the chemical composition of gel is not precisely understood, it is known that it is objectionable and usually forms in locally overheated stagnant masses of polymer. Various structures have been proposed to maintain the reaction mass in a state of motion and to promote heat transfer, particularly during the last stages of polymerization, all of which have failed to overcome this gelation problem. Furthermore, thermal degradation of the polymer is still encountered.

It is well known that a low surface-to-volume ratio of the materials undergoing polycondensation tends to limit the elimination of water or like product of reaction from the reaction mass. The disengagement of water or other volatile products from the reaction mass is of critical importance in successfully carrying out a polycondensation process. It is, therefore, highly desirable that a high-surface-to-volume ratio be maintained in order to promote the elimination of water or like material resulting from the union of molecules undergoing polycondensation, thereby increasing the efficiency of the polycondensation process.

It is, therefore, a primary object of this invention to provide a new and novel process for the manufacture of synthetic polymers.

Another object of this invention is to provide a new and novel process for making high quality synthetic linear polycondensation polymers, such as polycarbonamides and polymeric polymethylene terephthalate, particularly those having film- and fiber-forming properties.

Still another object of this invention is to provide a new and novel process for preparing synthetic linear polycondensation polymers which can be performed in a minimum of time, thus reducing or eliminating thermal degradation and gel formation in the polymer-forming reaction mass.

A further object of this invention is to provide a new and novel polymerization process for producing synthetic linear polymers in which a polycondensation process can be carried out in a rapid and efficient manner, utilizing a minimum of equipment and producing a polymeric end product substantially free of objectionable material, such as gel.

This invention further contemplates the provision of a new and novel process for forming synthetic linear polycondensation polymers, such as polyamides, characterized by having a high degree of turbulence and a high surface-to-volume ratio in the reaction mass during its conversion to high molecular weight polymers.

A still further object of this invention is to provide a new and novel process for making synthetic linear polymers which utilizes dynamic thin-film means adapted to draw off volatile material in the form of a vapor.

Other objects and advantages of the invention will become aparent from the following description thereof taken in connection with the accompanying drawing.

The objects of the invention are accomplished by providing a polymer-forming reaction mass which, in the preferred embodiment, includes an aqueous solution of a diamine-dicarboxylic acid salt. In the intial phases of the novel process the reaction mass is subjected to an elevated temperature and suitable pressure to evaporate some of the water of solution from the reaction mass. The residue of evaporation is subjected to suitable conditions for progressively converting the major portion of the reaction mass to a polycondensation product while removing the water of reaction or like substance eliminated as the result of the union of the molecules of the reaction mass. This resultant polymerized reaction mass, capable of undergoing further conversion to a higher molecular weight polymer, is conducted continuously through a path in a moving turbulent dynamic thin-film characterized by a high degree of turbulence and high surface-to-volume ratio. Heat is applied to the thin film to complete the conversion of the reaction mass to polymer. The dynamic thin-film is obtained by means of an evaporating unit through which the reaction mass is conducted or advanced rapidly in the form of a radially expanding, continuous dynamic thin-film which is heated during its movement through the unit.

The novel features believed to be characteristic of the invention are set forth with particularity in the appended claims. The invention, both as to its organization and method of operation, may be best understood by reference to the following description taken in conjunction with the accompanying drawing in which:

FIGURE 1 is a flow chart or diagram illustrating a polymerization process carried out in accordance with the invention;

FIGURE 2 is a plan view of a thin-film evaporating unit that may be used in carrying out the process of the invention; and FIGURE 3 is a sectional view taken substantially along line 3—3 of FIGURE 2 in the direction of the reference arrows.

With reference now to FIG. 1, there is shown schematically, by means of a flow chart or diagram, one embodiment of the novel method for making linear polymers contemplated by the invention. The polymerization apparatus employed to carry out the process in FIG. 1 comprises a pair of containers or mix tanks 10 and 11 in which proper proportions of the constituents embracing the polymer-forming composition are initially placed and uniformly mixed, if desired.

Although, in general, any suitable polymer-forming composition may be processed with the novel method of the invention, those materials capable of undergoing polycondensation to produce polymers of high molecular weight, e.g., those having fiber-forming characteristics, are preferably processed. It is with reference thereto that the novel method of this invention exemplarily will be described.

As an example of polymer-forming compositions, the reaction mass within mix tanks 10 and 11 may comprise a mixture of organic primary or secondary diamine and organic dicarboxylic acid, salt thereof, or a polymerizable monoamino acid. It should be understood that the method of the invention may be more advantageously practiced by initially providing the polyamide-forming composition in aqueous solution. For instance, a 45 to 50 weight percent or higher aqueous solution of hexamethylene diammonium adipate may be provided when it is desired to store the solution at or near room temperature under atmospheric pressure.

By means such as a pump 12 positioned within a feed line 13, the solution of polyamide-forming salt is conveyed to an evaporating unit or like means for expelling water, such as an evaporator 14 through which the mass is moved continuously. The proportion of polymer-forming material therein is increased to 60–75 percent or more by weight. Evaporator 14 may be of a well-known type of heat exchanger, such as shell and tube construction, in which heat is supplied to the reaction mass by means of a suitable heating medium, such as "Dowtherm" vapors, steam, or the like. The heating medium is moved continuously through unit 14 by means of inlet and outlet conduits 16 and 17. The reaction mass in evaporator 14 is preferably agitated by a suitable means (not shown) in order to improve the heat transfer and water expulsion conditions.

The aqueous solution of the polyamide-forming salt is heated sufficiently in evaporator 14 to evaporate some of the water of solution. For example, the salt solution may be heated to a temperature of approximately 105–115° C. for approximately 20–30 minutes at suitable pressures to bring about this evaporation. In the illustrated arrangement, the evaporated water of solution or vapor is removed from evaporator 14 through an outlet 18. In the evaporator a limited amount of oligomerization may take place, depending on the conditions employed.

The reaction mass processed in evaporator 14 is subsequently removed therefrom through a feed line 19 by a pump 21 and is conducted through an autoclave or reactor 22. In the illustrated embodiment, reactor 22 is preferably similar to evaporating unit 14, and may, therefore, be of the shell and tube type, through which the reaction mass is moved continuously while heat is applied to the mass. In order to obtain polycondensation of the salt of adipic acid and hexamethylene diamine, the reaction mass is pressurized within reactor 22 to a pressure of approximately 240–260 pounds per square inch, and is heated to an elevated polyamide-forming temperature of approximately 235° C. As in evaporator 14, the mass in the reactor is preferably heated by means of a heating medium continuously moved through inlet and outlet conduits 23 and 24, respectively. The mass undergoing polycondensation is agitated to improve the heat transfer conditions. The volatile products, including residual water of solution and the water of reaction produced in the reactor during polycondensation, are removed through a reactor outlet conduit 26.

At the superatmospheric pressure and polyamide-forming temperature existing within reactor 22, a large percentage of the reaction mass moving continuously therethrough is polycondensed and converted to a low molecular weight polyamide. Although the dwell time of the reaction mass in reactor 22 is necessarily selected in accordance with the particular process to be carried out, in one polymerization process embraced by the invention, a dwell time of approximately two hours is advantageous.

At the completion of the polymer conversion step in reactor 22, the partially polymerized mass is subsequently removed from the reactor through line 27 and is conveyed to a pressure reduction unit or flasher 28 by means of a pump 29. The partially polymerized reaction mass within flasher 28 is quickly and continuously brought to substantially atmospheric pressure. Occluded water in the liquid phase within the mass is evaporated or flashed therefrom, permitting an increase in the degree of polymerization. At the same time, heat is usually supplied to the mass to replace heat lost during the flashing operation. This heat may be supplied by means of a suitable heating medium flowing through fluid inlet and outlet conduits 31 and 32.

It should be understood that the above-described steps of the polymerization process incorporated in the novel process of the invention are well known and have been practiced generally throughout the industry. The pressure and temperature values, as well as the particular sequence of steps referred to above, are for illustrative purposes only and departures therefrom may be made within the scope of the invention in obtaining the partially polymerized reaction mass discharged from flasher 28. Furthermore, it should be understood that the mass leaving the flasher is not polycondensed to the desired degree. Further polycondensation resulting in a higher molecular weight polymer is necessary for a satisfactory end product.

The partially polymerized reaction mass at this stage is moderately viscous but not fiber-forming. In accordance with the present invention, means have been provided for rapidly completing the polymerization of the reaction mass to obtain a high viscosity polycarbonamide of excellent fiber-forming quality.

More specifically, the partially polymerized reaction mass is conducted through line 33 by means of a pump 34 to a third evaporating unit or "finisher" 35 and moved therethrough in the form of a turbulent thin-film characterized by a high surface-to-volume ratio. Finisher 35 is of the type commonly known as a "thin-film" evaporating unit and operates to rapidly move fluids to be processed through its interior as a dynamic thin-film. Conductive heat is supplied to the fluid as it progresses through the unit. Such a thin-film evaporating unit is readily available commercially and will be described in detail hereinafter.

Preferably this evaporating unit is an "Ajusto-Film" unit manufactured by the Kontro Company of Petersham, Massachusetts.

Heat is supplied to the dynamic thin-film reaction mass in finisher 35 by means of a heating medium or fluid flowing within a heating circuit 36 provided with a heater 37 for fluid heating. In finisher 35 the polymerization process is carried substantially to completion. The polymer is removed from the finisher through line 38. Vapors formed within finisher 35 are removed through an outlet 39.

In the polymer finishing operation carried out in finisher 35, residence time for the reaction mass is considerably shorter than in prior apparatus, thereby unexpectedly decreasing the formation of gel in the mass and substantially eliminating thermal degradation. The above described partially polymerized reaction mass, which heretofore required a finishing operation of approximately an hour or more, may now be carried to completion in a much shorter period of time to give a polymeric end product having a high degree of uniformity and being substantially free of gel. For instance, the reaction mass may be moved through the finisher in 5–10 minutes or less. Temperature in the finisher is usually maintained at between 240–300° C. when nylon 66 is the polycarbonamide being polymerized. Furthermore, it has been found that the use of a dynamic thin-film evaporating unit in the finishing operation described above gives much improved results over prior polymer-forming processes. In accordance with the novel concept of the invention, while any reduction in the thickness of the polymer layer moving through finisher 35 will provide an improvement in polymerization conditions, it is desirable to reduce the film to a thickness below 0.1 inch in order to achieve significant improvement. Therefore, the film thickness should be selected from the range of 0.005 to 0.1 inch. Preferably, the film has a thickness within the range of 0.01 and 0.05 inch.

A thin-film evaporating unit of a type quite suitable for performing the finishing operation of the invention is shown in FIG. 2 and is designated generally by the numeral 35 as referred to above. As previously explained, commercially available dynamic thin-film evaporating units may be employed. The unit illustrated in FIGURES 2 and 3 can be employed to give the outstanding results herein.

With reference to FIGURES 2 and 3, unit 35, which may be of any size according to the heat transfer and throughput capacity required, comprises a substantially cylindrical straight portion 41 and a frusto-conical portion 42, having a wall 43 defining an evaporating chamber 44. A hollow shaft 46 is positioned axially within unit 35 and extends centrally therethrough. This shaft is rotatably supported at each end thereof by means such as bearings 47 and 48. Shaft 46 contains a central bore 49 and a plurality of inlet openings or ports 51 within its wall communicating with chamber 44 as shown best in FIG. 3. A plurality of circumferentially spaced and radially extending tapered vanes or blades 52 are suitably mounted on the outer surface of shaft 46 so as to be rotated thereby. Each of vanes 52 has an outer edge 53 positioned in closely spaced relationship with the inner surface of side wall 43. The outer edges 53 of vanes 52 define, together with the inner surface of wall 43, a radially thin, annular clearance area 54 through which the reaction mass is conveyed as a dynamic thin-film. This clearance is adjustable by moving the rotor axially to bring vane edges 53 nearer to or farther from the inner surfaces of wall 43.

Unit 35 is also provided with an inlet 55 through which the reaction mass is conducted into chamber 44. Blades 52 are notched at 56 adjacent to the inner end of inlet 55 so that proper spreading or annulation of the reaction mass is obtained initially along the inner surface of chamber wall 43. The reaction mass in a thin dynamic annular film is carried along the inner peripheral surface of chamber wall 43 within the clearance area 54 in the direction of the arrow H as a result of gravity and centrifugal forces developed by the rotation of vanes or blades 52. When the continuously moving reaction mass reaches the right hand end of unit 35, as viewed in FIG. 3, it will then flow through a discharge pipe or outlet 57 secured in a suitable manner to the enlarged end of unit 35.

In order to transfer heat to the reaction mass, moving in the form of a thin film, during its journey along the inner surface of wall 43, a jacket 58 is suitably secured to the outer periphery thereof. The jacket is provided with inlet 59 and outlet 60 so that a heating medium or fluid of a well-known type, such as "Dowtherm" or the like, may be passed continuously therethrough in conductive heat transfer relationship with the reaction mass thin film flowing within clearance area 54.

During the processing of the reaction mass in unit 35, which includes the transfer of heat to the mass, volatile products, such as water vapor and like substances produced during heating in the above described manner of the reaction mass thin-film, will flow radially inwardly through vapor ports 51 in the wall of shaft 46 and axially along shaft bore 49 in the direction of arrow I. A plurality of discharge wall openings 61 are provided in the section of shaft 46 extending within unit portion 41 through which these volatile products flow out the shaft interior and are subsequently removed or carried away through an outlet pipe or discharge duct 62 in unit portion 41.

In highly viscous polymer the diffusion of the major byproduct, such as glycol or water vapor, is very slow. Similarly, the rate of heat transfer, principally by conduction, is also slow.

In static or slow-moving laminar layers of polymer, the transient diffusion rate is inversely proportional to approximately the square of the thickness of the layer of polymer through which vapor must diffuse in order to reach a free surface. Furthermore, the rate of transient heat transfer by conduction is inversely proportional to approximately the square of the thickness of the layer through which the heat flows. Thus, film or layer thickness has very pronounced effect upon two of the controlling physical processes involved in completing the polymerization process. In the process of the invention, which provides a dynamic thin-film, heat and vapor flow rates are greatly increased by the turbulence within the film, as well as by the controlled thin film thickness.

It is evident that since water vapor or other volatiles can only escape at the free surface of the polymer, an increase in the polymer surface-to-volume ratio will lead to an increase in the rate of vapor loss per unit volume of polymer. For dynamic thin-films of polymer in the range of thicknesses preferred for the process of the invention, the instantaneous surface-to-volume ratio is approximately inversely proportional to the thickness of the film, that is, when the film thickness is reduced by one-half the surface-to-volume ratio is almost doubled. Thus, the process of the invention substantially increases the surface-to-volume ratio by mechanically forcing the polymer stream to assume the form of a continuous thin dynamic layer as it flows through the finisher. It is quite feasible and practical to provide a surface-to-volume ratio on the order of 150 square inches per cubic inch of polymer.

Another significant condition promoting the disengagement of water vapor or the like is the continual regeneration of the polymer free surface with each passage of the rotating vane across the layer of polymer, mechanically moving polymer from the interior of the film to the surface. This mechanically generated mixing or turbulence also increases the probability that still reactive polymeric units will be brought into favorable juxtaposition for further reaction.

From all of the foregoing, it is seen that by providing a continuous, mechanically formed, dynamic thin film of polymer through which heat and vapor must flow and within which the chemical reaction must proceed, all three of the most significant physical variables controlling the ultimate degree of polymerization are effectively increased in magnitude. These variables are heat transfer rate, internal diffusion rate, and external diffusion rate at the surface.

The superiority of the process of the invention is readily seen by comparison with conventional polymer "finishing." Conventional processes provide for either a large unstirred pool of polymer with agitation provided only by the rise of vapor bubbles through the liquid, or a reservoir of polymer stirred slowly by a series of partially submerged discs or screw flights mounted on a shaft rotating no faster than 5 r.p.m. In these mechanically agitated processes the instantaneous surface-to-volume ratio seldom exceeds 3 square inches per cubic inch and is almost necessarily less than about 5 or 6 square inches per cubic inch. To obtain the necessary surface exposure, polymer is mechanically lifted into the vapor space as a coating or relatively stagnant film of material on the slowly rotating discs, the film thickness being determined wholly by gravity flow, local viscosity, and surface tension of the polymer.

Other conventional processes simply spread polymer by recirculating systems or by stirring in a manner such that polymer must drain down a heated surface, film thickness and laminar flow rate again being dependent upon gravity, viscosity, and surface tension. To achieve the requisite degree of polymerization by such processes requires that equipment of prohibitive size be employed, or, more commonly, that the net flow rate of polymer must be very low to permit sufficient exposure time for the desired degree of polymerization to occur. These processes are in sharp contrast with the process of the invention in which, independently of gravity, viscosity, and surface tension, the polymer is mechanically maintained in a continuous dynamic thin-film that permits rapid reaction, high net flow rates and attendant quality improvements in the polymer.

Although molecular weight of polymer is a proper measure of the degree of reaction in polymerization, determination of molecular weight is quite difficult particularly since the reaction product normally includes a wide range of molecular sizes. Polymer viscosity, a function of molecular weight, is most commonly used for characterization and control of polymerization. Many different definitions and determinations of viscosity are used, depending upon the particular polymer under consideration. For the commercially important polyamides and polyesters, however, "relative viscosity" has proven a convenient and practical measure of degree of polymerization.

The relative viscosity of a polymer is defined as the ratio of the absolute viscosity of a solution of polymer in solvent to the absolute viscosity of polymer-free solvent, these viscosities being measured at the same temperature. The numerical magnitude of relative viscosity is, therefore, arbitrary, depending upon the particular solvent and the concentration of polymer in the solution.

For the important polyamides, nylon 66 and nylon 6, 90% formic acid is a commonly used solvent. Relative viscosity is based upon a solution of 8.4% by weight of polymer in 90% formic acid, with viscosity of both pure solvent and solution being measured at 25° C. The term "relative viscosity" used below refers to measurements made by this procedure. Partially polycondensed nylon 66 entering the finisher does not necessarily have to be at any certain degree of polymerization. Nevertheless, nylon 66, as it enters the finisher, usually has a relative viscosity between 8 and 20.

A relative viscosity of at least 25 is required to yield spinnable fibers. Commercially useful nylon 66 and nylon 6 fibers are produced from polymer with a relative viscosity of 30 or higher, depending upon the specific fiber characteristics desired. Very strong filaments for tire cord or rope, for example, are usually produced from polymer with relative viscosity not less than 45. The process of the invention can yield polymers having a wide range of polymerization. The end use to which a particular polymer will be put determines the degree of polymerization to be attained. Polymers having relative viscosity from 30 up to about 80 can be obtained by using the process of the invention.

Relative viscosity of polymethylene terephthalate is determined by a procedure analogous to that used with polyamides except for the difference in solvent and polymer concentration. That is, the absolute viscosity of a 10% by weight of polymer solution is measured at 25° C. The solvent is a mixture of 6 parts by weight of 2,4,6-trichlorophenol and 10 parts of phenol. The absolute viscosity of the phenol-trichlorophenol mixture is also measured at 25° C. The ratio of the solution viscosity to solvent viscosity, thus determined, is the relative viscosity.

Polymeric ethylene terephthalate exhibits fiber-forming characteristics at relative viscosity as low as about 10. Fibers with sufficient strength for commercial applications require polymer with relative viscosity of at least 20 and preferably above 25. For high strength yarns, such as those in tire cord, a relative viscosity value above about 90 is preferred. Partially polymerized polymer usually enters the finisher with a relative viscosity between 6 and 20. Generally, the polymer exiting from the finisher has a relative viscosity between 25 and 90, depending upon the specific operating conditions employed.

In the application of the dynamic thin-film process to polyethylene terephthalate, the low molecular weight polymer or prepolymer feed stream is prepared by a known process. Flow path of prepolymer and finished polymer through the apparatus is similar to that described for nylon. The polymer finishing process is carried on under subatmospheric pressure. Preferably, absolute pressure in the vapor space is maintained at less than 2 mm. of mercury. Glycol vapor expelled from the polymer flows out through a condenser (not shown) between finisher vapor outlet 62 and the vacuum source, which may be a rotary vacuum pump, or preferably, a multistage steam jet-ejector. Glycol vapor off-gas is recovered by the condenser.

For polyester finishing, the same limitations on rotor clearance applies as for nylon, namely, it should not exceed about 100 mils. The turbulence factor (T.F.), defined subsequently, must be within the range of 10–50,000 and is preferably within the range 150–30,000. The invention is further illustrated by the following example.

*Example*

The dynamic thin-film finisher process was demonstrated with a thin-film finisher of the form illustrated in FIGS. 2 and 3. Frusto-conical shell 43 had an inside diameter of 3¾ inches at the small end (inlet) and an inside diameter of 9¾ inches at the large end (outlet), the cone angle between walls 43 was 24°, and the inside length of the shell was 14 inches. Hollow shaft 46 of the rotor was 2⅛ inches outside diameter by 1⅝ inches inside diameter with four vanes 52 spaced symmetrically around the shaft, 90° apart. The entire rotor was dynamically balanced and the vanes were carefully machined to mate against the opposing inner surface of shell wall 43. Heat was supplied to the finisher by circulating through jacket 58 liquid "Aroclor," a well known commercial heat transfer medium composed of chlorinated biphenyl, manufactured by the Monsanto Chemical Company. The circulating "Aroclor" was heated by submerged electrical cartridge heaters, the power to which was controlled by a standard temperature controller actuated by a thermocouple exposed to the "Aroclor" entering the jacket. The effective heat transfer surface of inner wall 43 upon which the dynamic thin-film was maintained was approximately 1.85 square feet. All process lines were traced with electrical resistance heating tape and the entire system was covered with high temperature thermal insulation.

The conventional process outlined in the flow diagram of FIG. 1 was operated under substantially normal conditions except for the last step in the process in which the dynamic thin-film evaporator was used to "finish" the polymer. Polymer at the rate of approximately 40 lbs. per hour was produced under continuous, steady operating conditions.

Aqueous hexamethylene diammonium adipate salt solution containing 48% by weight of salt was pumped into evaporator 14 in which pressure was maintained at 25 p.s.i.g., and a temperature of 147° C. Effluent from the evaporator contained about 75% by weight of nylon 66 salt. The temperature of the concentrated salt stream into reactor 22 was slowly raised from 210° C. with pressure being controlled at 250 p.s.i.g. Samples of effluent from the reactor had a relative viscosity of about 7, indicating an average molecular weight of about 4000. With further heating the stream from the reactor entered flasher 28 where expansion at approximately atmospheric pressure occurred while temperature was controlled at about 240° C. Polymer samples from the flasher had relative viscosity of approximately 15, corresponding to an average molecular weight of about 7,000. This low molecular weight polymer comprised the feed stream to dynamic thin-film finisher 35, in which the final stages of the polymerization reaction were completed.

"Aroclor" temperature in the jacket of the dynamic thin-film finisher was controlled at 285° C. Pressure inside the finisher was slightly above atmospheric (static head of 2–6 inches of water). The rotor was driven at a speed of 1200 revolutions per minute with the vane-to-wall clearance set at 0.025 inch. Under these conditions the free film surface is regenerated 80 times per second by the edges of the vanes sweeping across the film of polymer at an average linear speed of about 6 feet per second at the inlet end and about 16 feet per second at the outlet end. Thus, the polymeric material was necessarily maintained in a state of high turbulence at the leading edge of each vane and within the nominal 0.025 inch film.

The actual residence time of polymer in the dynamic thin-film finisher was estimated by injecting a small quantity of black nigrosine dye into the entering stream of polymer and noting the time of first appearance and final disappearance of color in the exit stream of finished polymer. The average residence time thus determined was 6 to 7 minutes, contrasting very favorably with the 55 to 70 minutes required in most conventional nylon 66 finishers.

Polymer from the dynamic thin-film finisher was extruded onto a broad, rotating, stainless steel wheel sprayed with cooling water. Thus, a thick ribbon of nylon 66 polymer was formed. This polymer was remarkably white or translucent and the relative viscosity was determined to be approximately 41, corresponding to an average molecular weight of about 16,000 well within the range suited to high strength fibers. No evidence of gel was detectable when polymer chips were examined under ultra-violet light. Polymer produces strong fluorescence when subjected to ultra-violet light if gel is present.

Although the term "turbulent thin film" has been used to describe the state of motion of the polymer passing through the finisher, the actual motion is very complex and it seems preferable to use the term "dynamic thin-film." Polymer moves into and out of the actual film under mechanical shear imposed by the moving vane or scraper. Polymer borne along by the leading edge is necessarily undergoing the vortical motion characteristic of turbulence while impressed radial forces and axial forces are simultaneously acting to provide a component of velocity in each of these directions. Each element of polymer is, therefore, moving under the action of radial, axial, and tangential forces. The tangential force is due directly to the relative motion of the vane edge and heating surface provided by the inner wall of the shell and is the dominating motive force acting on the polymer.

Because of the complexity of the motion of the polymer, which is also undergoing chemical change, it is quite impracticable even in theory, to characterize the flow conditions quantitatively. Nevertheless, since the impressed shear has its maximum practical effect on very viscous material, a useful arbitrary factor can be utilized for practical purposes. Determination of absolute viscosity of the polymer under actual conditions is altogether impracticable, so relative viscosity is used to characterize the polymer itself. In view of this, the arbitrary factor is termed "relative viscosity turbulence factor" (T.F.), defined by the relationship:

$$\text{T.F.} = \frac{tv}{(RV)}$$

where:
$t$=the clearance between the scraper or vane edge and the heat transfer surface or wall, measured in mils (one-thousandth of an inch);
$v$=the velocity of the scraper or vane edge relative to the heat transfer surface, measured in feet per minute;
$RV$=relative viscosity of the finished polymer leaving the finisher.

For the preferred form of finisher, having frusto-conical shape, the preceding equation may be rewritten:

$$\text{T.F.} = \frac{2\pi r_0 St}{(RV)}$$

$$\text{T.F.} = 6.283 \frac{r_0 St}{(RV)}$$

The new symbols are:
$r_0$=the radius or radial distance of the edge of the vane from the axis of rotation at the outlet end of the finisher, expressed in feet;
$s$=speed of rotation of the rotor, expressed in revolutions per minute (r.p.m.);
$\pi$=the common ratio of circumference to diameter of a circle—3.14.

In the example:

$RV=41$
$r_0=4.80''$ (0.40 ft.)
$t=25$ mils
$s=1200$ r.p.m., and $$\text{T.F.} = 6.283 \frac{(0.40)(1200)(25)}{41} = 1840$$

In order to achieve the advantages of the process of the invention, it is necessary that T.F. be greater than 15. It is practicable to operate with T.F. up to 60,000; but, the preferred range of T.F. for commercial practice is from 65 to 35,000, with the clearance "$t$" not greater than 100 mils.

At very high T.F. values, i.e., above 60,000, power consumption becomes generally prohibitive. Therefore, any further improvement in polymer finishing rate is not commensurate with the requisite increase in power. It should also be noted in this respect that the actual heat energy supplied through dissipation of mechanical energy as internal friction in the polymer becomes appreciable at high T.F. values, especially with high viscosity polymer, i.e., relative viscosity greater than about 50. This matter should be considered in setting the temperature control limits for the finisher.

The clearance "$t$," which determines the instantaneous thickness of the dynamic thin film of polymer, should not exceed about 100 mils. As the clearance is increased beyond 100 mils a point is soon reached at which the principal advantages of the invention are lost. At such point, the process becomes similar to the ordinary process in a stirred autoclave. Stirring action adjacent an unduly thick film of polymer does contribute somewhat to the uniformity of the polymer, but it does not provide the rapid heat transfer and diffusion necessary to the rapid polymerization characteristic of the process of the invention.

While there has been described what at present is considered to be the preferred embodiment of the invention, it will be understood by those skilled in the art that various changes and modifications may be made therein without departing from the invention. Therefore, it is the aim of the appended claims to cover all such changes and modifications as fall within the spirit and scope of the invention.

What is claimed is:

1. A process for preparing a film and fiber-forming poly-condensation polymer from a further polycondensable polymer selected from the group consisting of polyhexamethylene adipomide and poly-epsilon-caproamide having a relative viscosity between 8 and 20 measured as an 8.4% solution of polymer in 90% formic acid at 25° C., and polymethylene terephthalates having a relative viscosity between 6 and 20 measured as a 10% by weight solution of polymer in a solvent mixture of 6 parts by weight 2,4,6-trichlorophenol and 10 parts phenol at 25° C. said relative viscosities being measured as the ratio between the absolute viscosity of the polymer solution and the absolute viscosity of pure solvent at the same temperature, comprising the steps of:
   (a) feeding said polycondensable polymer into the smaller end of a heated reaction zone having a frusto-conical shape;
   (b) continuously mechanically moving said further polycondensable polymer through said heated reaction zone in the form of a radially expanding continuous dynamic thin film;
   (c) continuously axially removing vapors radially expelled from the polycondensation of said polycondensable polymer thus producing a film and fiber-forming polymer having a relative viscosity between 30 and 80, said relative viscosity being determined for the particular polymer as above; and
   (d) removing said film and fiber-forming polymer from the larger end of said heated frusto-conical shaped reaction zone.

2. The process of claim 1 wherein the polymer is polymeric hexamethylenediammonium adipate.

3. The process of claim 1 wherein the radially expanding continuous dynamic thin film has a relative viscosity turbulence factor between 15 and 60,000.

4. The process of claim 3 wherein the film has a thickness between 0.005 and 0.1 inch.

5. The process of claim 3 wherein the film has a thickness between 0.01 and 0.05 inch.

6. A process of preparing film and fiber-forming polymeric hexamethylenediammonium adipate from further polycondensable hexamethylenediammonium adipate having a relative viscosity value between 8 and 20 determined as the ratio between the absolute viscosities of a 8.4% by weight solution of said polycondensable hexamethylenediammonium adipate in 90% formic acid as solvent at 25° C. and the absolute viscosity of pure solvent at 25° C., comprising the steps of:
   (a) feeding said further polycondensable hexamethylenediammonium adipate to the smaller end of a frusto-conical shaped reaction zone heated to a temperature between 240 and 300° C.;
   (b) continuously mechanically moving said further polycondensable hexamethylenediammonium adipate through said zone during a residence time from 5 to 10 minutes in the form of a thin radially expanding continuous film having a thickness between 0.005 and 0.1 inch wherein the relative viscosity turbulence factor of said film is between 15 and 60,000;
   (c) continuously axially removing water of reaction radially expelled from the further polycondensation of said hexamethylenediammonium adipate thus producing film and fiber-forming hexamethylenediammonium adipate having a relative viscosity between 30 and 80 measured as above; and
   (d) removing said film and fiber-forming hexamethylenediammonium adipate from the larger end of said frusto-conical shaped reaction zone.

References Cited by the Examiner
UNITED STATES PATENTS

| | | | |
|---|---|---|---|
| 2,687,552 | 8/1954 | Gabler | 260—78 |
| 2,731,081 | 1/1956 | Mayner | 260—78 |
| 2,908,666 | 10/1959 | Notarbartole | 260—78 |
| 3,044,993 | 7/1962 | Tiemersma | 260—78 |

FOREIGN PATENTS 614,625  12/1948  Great Britain.

WILLIAM H. SHORT, *Primary Examiner.*

H. D. ANDERSON, *Assistant Examiner.*